(12) United States Patent
Wu et al.

(10) Patent No.: US 9,817,219 B1
(45) Date of Patent: Nov. 14, 2017

(54) INFINITY MIRROR

(71) Applicant: AURAS Technology Co., Ltd., New Taipei (TW)

(72) Inventors: An-Chih Wu, New Taipei (TW); Mu-Shu Fan, New Taipei (TW); Chie-Sheng Lim, New Taipei (TW); Yen-Ling Liu, New Taipei (TW)

(73) Assignee: AURAS TECHNOLOGY CO., LTD., New Taipei (TW)

( * ) Notice: Subject to any disclaimer, the term of this patent is extended or adjusted under 35 U.S.C. 154(b) by 0 days.

(21) Appl. No.: 15/169,893

(22) Filed: Jun. 1, 2016

(30) Foreign Application Priority Data

Apr. 29, 2016 (TW) .............................. 105113487 A

(51) Int. Cl.
*G02B 5/08* (2006.01)
*G02B 17/00* (2006.01)
*G09F 19/16* (2006.01)

(52) U.S. Cl.
CPC ......... *G02B 17/004* (2013.01); *G02B 5/0816* (2013.01); *G09F 19/16* (2013.01)

(58) Field of Classification Search
CPC .... G02B 17/004; G02B 5/0816; G02B 5/122; G02B 27/2292; G02B 27/2214; G02B 6/0055; G02B 6/0043; G02B 19/0028; G02B 19/0061; G09F 19/16
USPC ......................................................... 359/839
See application file for complete search history.

(56) References Cited

U.S. PATENT DOCUMENTS 8,821,001 B2 * 9/2014 Minami ............... G02B 6/0043
349/15

\* cited by examiner

*Primary Examiner* — Euncha Cherry
(74) *Attorney, Agent, or Firm* — WPAT, PC

(57) ABSTRACT

An infinity mirror includes a light-transmissible and reflective layer, a reflective layer, a light-transmissible layer and at least one light-emitting element. The light-transmissible and reflective layer is disposed on a top surface of the light-transmissible layer. The reflective layer is disposed on a bottom surface of the light-transmissible layer. The at least one light-emitting element emits a light beam. The light-transmissible layer includes a pattern zone and a non-pattern zone. There is a height difference between the pattern zone and the non-pattern zone of the light-transmissible layer. The infinity mirror can provide a multi-mirror image effect.

12 Claims, 5 Drawing Sheets

INFINITY MIRROR

FIELD OF THE INVENTION

The present invention relates to an infinity mirror, and more particularly to an infinity mirror with diversified technological designs and expansive applications.

BACKGROUND OF THE INVENTION

An infinity mirror is a design used in interior decoration or artistic device. In accordance with the principle of the infinity mirror, the "mutual reflection" of two mirrors produces infinite number of mirror image effects and infinite spatial effects in the mirrors. Conventionally, the structure of the infinity mirror is designed according to the mirror reflection principles for planar mirrors. Generally, the structure of the infinity mirror comprises a first glass layer, a second glass layer and a light-emitting element. The first glass layer is a light-transmissible and reflective layer. The second glass layer is a mirror layer. The light-emitting element is arranged between the first glass layer and the second glass layer. When the light-emitting element emits light beams, the light beams are repeatedly reflected and transmitted between the first glass layer and the second glass layer. Consequently, the light beams appear to recede into infinity, creating the appearance of a mirror image effect.

However, the conventional infinity mirror is used in interior decoration or artistic device. Usually, the dot beams appear to recede into infinity so as to produce the aesthetically-pleasing appearance of multiple mirror images. That is, the efficacy and the application of the infinity mirror are limited to the infinite extension of the dot beams and the extension change of the visual sense.

Moreover, few applications of the infinity mirror involve the combination of the infinity mirror and a pattern or a logo, especially the integration of diversified technological designs to enhance the mirror image effect of the pattern or the logo in the infinity mirror. The mirror image effect such as the stereoscopic sense or the visual layering sense can provide visual beauty of stereoscopic depth to people.

Therefore, there is a need of providing an infinity mirror with diversified technological designs and plural functions in order to expand the applications of the infinity mirror.

SUMMARY OF THE INVENTION

An object of the present invention provides an infinity mirror for enhancing the multi-mirror image effect in order to overcome the drawbacks of the conventional technologies.

Another object of the present invention provides an infinity mirror with diversified technological designs and expansive applications in order to overcome the drawbacks of the conventional technologies.

In accordance with an aspect of the present invention, there is provided an infinity mirror. The infinity mirror includes a light-transmissible layer, a light-transmissible and reflective layer, a reflective layer and at least one light-emitting element. The light-transmissible layer includes a pattern zone and a non-pattern zone. There is a height difference between the pattern zone and the non-pattern zone of the light-transmissible layer. The light-transmissible and reflective layer is disposed on a top surface of the light-transmissible layer. The reflective layer is disposed on a bottom surface of the light-transmissible layer. The at least one light-emitting element emits a light beam.

In an embodiment, the light-transmissible and reflective layer further includes a second pattern zone and a second non-pattern zone corresponding to the pattern zone and the non-pattern zone of the light-transmissible layer. Moreover, sizes and shapes of the second pattern zone and the second non-pattern zone of the light-transmissible and reflective layer are respectively identical to sizes and shapes of the pattern zone and the non-pattern zone of the light-transmissible layer. There is a second height difference between the second pattern zone and the second non-pattern zone of the light-transmissible and reflective layer.

In an embodiment, at least one microstructure is included in the pattern zone, and the at least one microstructure includes an unsmooth surface structure.

In an embodiment, the pattern zone includes a text, a number, a symbol, a geometric pattern and/or a totem.

In an embodiment, a transparency/reflectivity ratio of the light-transmissible and reflective layer is in a range between 40/60 and 90/10.

In an embodiment, the infinity mirror further includes a temperature-sensitive film, and the temperature-sensitive film is arranged between the reflective layer and the light-transmissible layer. When a change of the ambient temperature is sensed by the temperature-sensitive film, a color of the temperature-sensitive film is correspondingly changed.

In an embodiment, the infinity mirror further includes a printed layer, and the printed layer is arranged between the light-transmissible layer and the reflective layer.

In an embodiment, the at least one light-emitting element is disposed on an outer shell of a heat sink of an electronic device, and the infinity mirror is installed on the outer shell of the heat sink.

In an embodiment, a receiving recess is formed in the light-transmissible layer, and the at least one light-emitting element is accommodated within the receiving recess. The receiving recess is formed in an outer periphery of the light-transmissible layer or formed in a bottom surface of the light-transmissible layer.

In an embodiment, the at least one light-emitting element includes a light emitting diode, an organic light-emitting diode and/or a luminescent paper.

In an embodiment, a top surface of the pattern zone is higher than a top surface of the non-pattern zone.

In an embodiment, a top surface of the pattern zone is lower than a top surface of the non-pattern zone.

In an embodiment, a top surface of a first portion of the pattern zone is higher than a top surface of a first portion of the non-pattern zone, and a top surface of a second portion of the pattern zone is lower than a top surface of a second portion of the non-pattern zone.

From the above descriptions, the present invention provides an infinity mirror with diversified technological designs and expansive applications. Due to the height difference between the pattern zone and the non-pattern zone of the infinity mirror, the multi-mirror image effect corresponding to the overall pattern zone is enhanced. Moreover, in case that the microstructures are disposed on the top surface of the pattern zone, the multi-mirror image effect corresponding to the overall pattern zone is further enhanced. In case that the printed layer is formed on a surface of the light-transmissible layer, the light beams reflected in the infinity mirror can produce the multi-mirror image effect with the layering sense. In case that the temperature-sensitive film is arranged between the reflective layer and the light-transmissible layer, the temperature-sensitive film can sense the change of the ambient temperature and display the temperature status of the environment. Since the multi-mirror image effect is enhanced, the visual beauty is increased and the function of sensing the ambient temperature is achieved, the applications of the infinity mirror are expanded.

The above objects and advantages of the present invention will become more readily apparent to those ordinarily skilled in the art after reviewing the following detailed description and accompanying drawings, in which:

DETAILED DESCRIPTION OF THE PREFERRED EMBODIMENT

The present invention provides an infinity mirror. There is a height difference between a pattern zone and a non-pattern zone of the infinity mirror. The infinity mirror has diversified technological designs. For example, the height difference is changed, a microstructure is included in the pattern zone, or a printed layer is formed on a bottom surface of a light-transmissible layer. The diversified technological designs are the features of the infinity mirror of the present invention. In some embodiments, the infinity mirror is equipped with a temperature-sensitive film for sensing the change of the ambient temperature of the infinity mirror. Consequently, the color of the multi-mirror image effect displayed on the infinity mirror is correspondingly changed. The present invention will now be described more specifically with reference to the following embodiments. It is noted that the following descriptions of preferred embodiments of this invention are presented herein for purpose of illustration and description only.

Figure 1A:
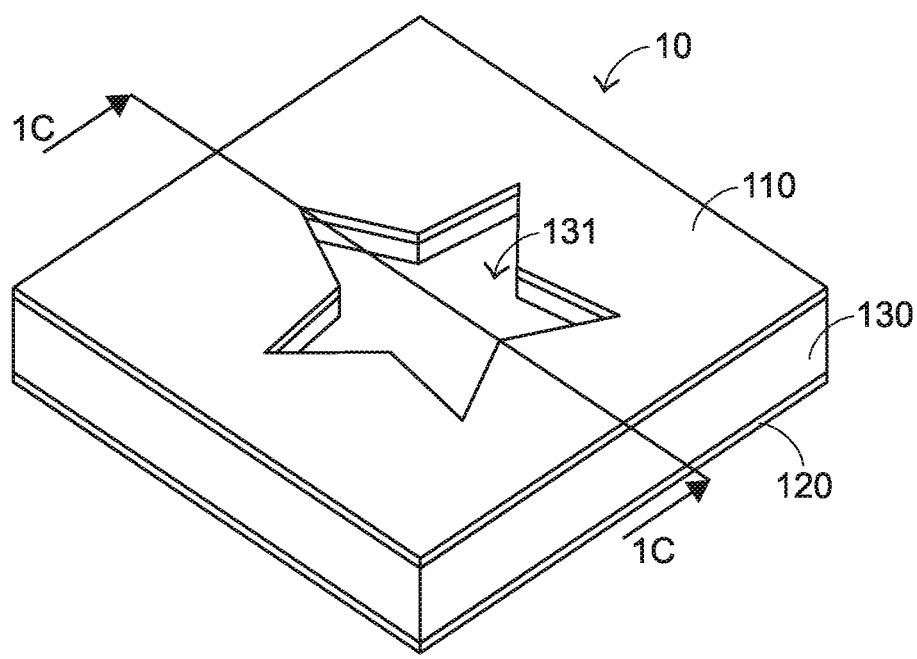
FIG. 1A is a schematic perspective view illustrating an infinity mirror according to an embodiment of the present invention.
Figure 1B:
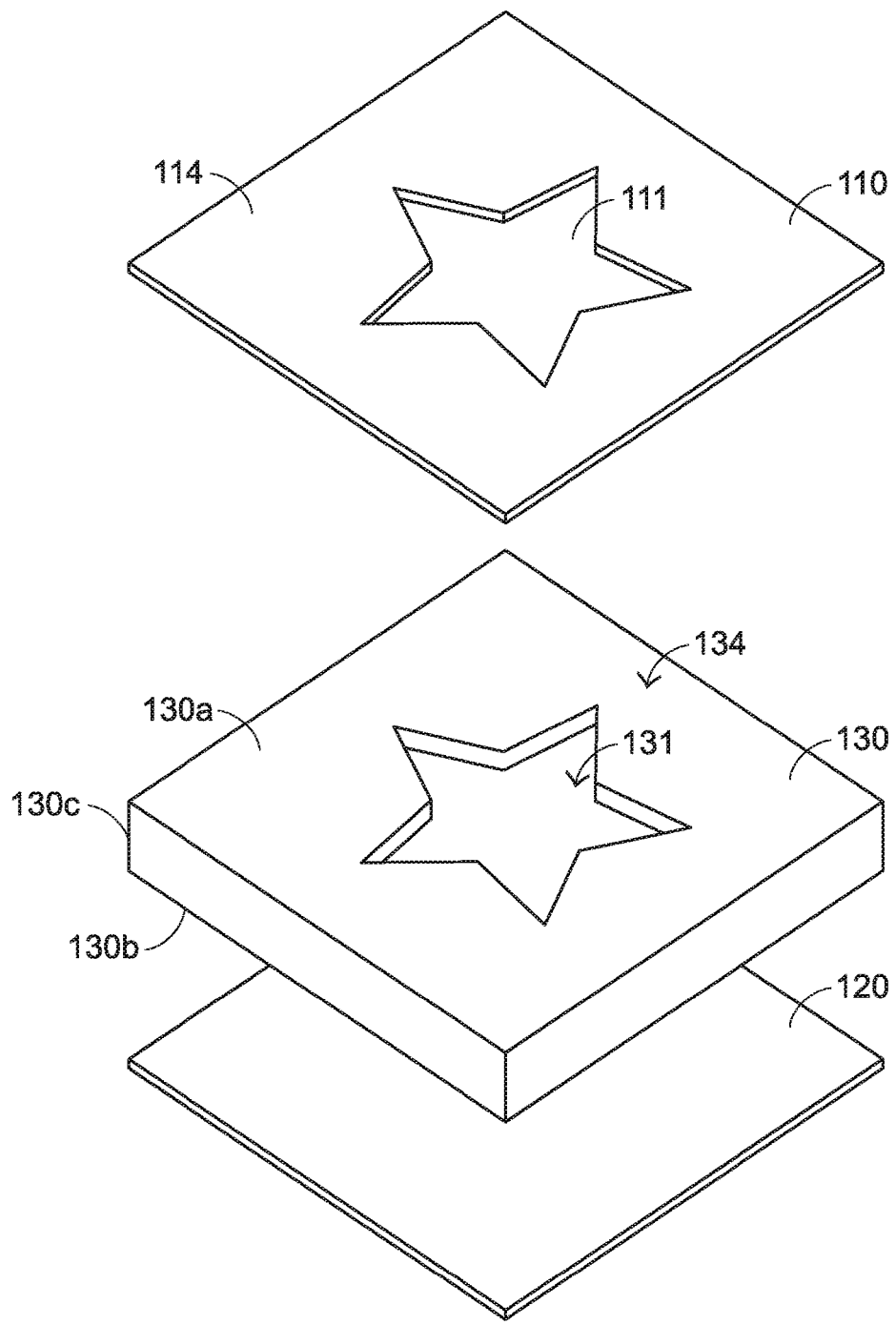
FIG. 1B is a schematic exploded view illustrating the infinity mirror of FIG. 1A.
Figure 1C:
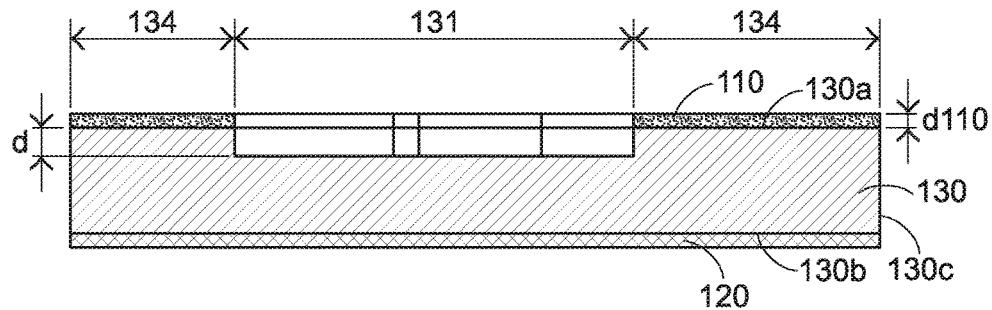
FIG. 1C is a schematic cross-sectional view illustrating the infinity mirror of FIG. 1A and taken along the line 1C-1C.

The concepts of the infinity mirror of the present invention will be illustrated with reference to FIGS. 1A, 1B and 1C. FIG. 1A is a schematic perspective view illustrating an infinity mirror according to an embodiment of the present invention. FIG. 1B is a schematic exploded view illustrating the infinity mirror of FIG. 1A. FIG. 1C is a schematic cross-sectional view illustrating the infinity mirror of FIG. 1A and taken along the line 1C-1C. The infinity mirror 10 comprises a light-transmissible and reflective layer 110, a reflective layer 120 and a light-transmissible layer 130. The light-transmissible layer 130 comprises a top surface 130a, a bottom surface 130b, an outer periphery 130c, a pattern zone 131 and a non-pattern zone 134. In accordance with a feature of the present invention, there is a height difference between the pattern zone 131 and the non-pattern zone 134. Due to the height difference, the mirror image effect of the pattern zone 131 is enhanced while the pattern zone 131 is reflected by the infinity mirror 10. Similarly, the light-transmissible and reflective layer 110 comprises a pattern zone 111 and a non-pattern zone 114. There is a height difference between the pattern zone 111 and the non-pattern zone 114.

The relationships between these components will be described in more details as follows. Please refer to FIGS. 1A, 1B and 1C again. The light-transmissible and reflective layer 110 and the reflective layer 120 are attached on a top surface 130a and a bottom surface 130b of the light-transmissible layer 130, respectively. The areas, shapes or sizes of the light-transmissible and reflective layer 110, the reflective layer 120 and the light-transmissible layer 130 may be varied according to the practical requirements. Especially, there is a height difference between the pattern zone 131 and the non-pattern zone 134. Similarly, there is a height difference between the pattern zone 111 and the non-pattern zone 114. Consequently, the height difference between the pattern zone 111 and the non-pattern zone 114 and the height difference between the pattern zone 131 and the non-pattern zone 134 will result in the similar mirror image effects.

In an embodiment, the light-transmissible and reflective layer 110 and the reflective layer 120 are respectively formed on the top surface 130a and the bottom surface 130b of the light-transmissible layer 130 by a sputtering process. Consequently, the light beams from plural light-emitting elements are repeatedly reflected and transmitted between the light-transmissible and reflective layer 110 and the reflective layer 120 to produce a multi-reflection mirror image effect. Under this circumstance, the light beams appear to recede into infinity, and thus the visual effect of generating infinite images of the pattern zone 131 is achieved.

Preferably, the transparency/reflectivity ratio of the light-transmissible and reflective layer 110 is in the range between 40/60 and 90/10. In case that the transparency/reflectivity ratio of the light-transmissible and reflective layer 110 is 40/60, 40 percentage of the light beams from the reflective layer 120 is transmitted through the light-transmissible and reflective layer 110, and 60 percent of the light beams is reflected back to the reflective layer 120 by the light-transmissible and reflective layer 110. In case that the transparency/reflectivity ratio of the light-transmissible and reflective layer 110 is 90/10, 90 percentage of the light beams from the reflective layer 120 is transmitted through the light-transmissible and reflective layer 110, and 10 percent of the light beams is reflected back to the reflective layer 120 by the light-transmissible and reflective layer 110. The transparency/reflectivity ratio of the light-transmissible and reflective layer 110 may be varied according to the practical requirements.

An example of the pattern zone 131 of the infinity mirror 10 includes but is not limited to a text, a number, a symbol, a geometric pattern and/or a totem. For example, the pattern zone 131 is a product trademark or a logo pattern. In the example of FIG. 1A, the pattern zone 131 has a shape of a star. It is noted that the example of the pattern zone 131 may be varied according to the practical requirement.

As shown in FIG. 1C, there is a height difference d between the pattern zone 131 and the non-pattern zone 134. In practice, the pattern zone 131 is protruded from or concavely formed in the top surface 130a or the bottom surface 130b of the light-transmissible layer 130. In the example of FIG. 1C, the pattern zone 131 is concavely formed in the top surface 130a of the light-transmissible layer 130. In another embodiment, the pattern zone 131 with the height d is formed by a concave milling process. Alternatively, the pattern zone 131 with the height d is integrally formed with the light-transmissible layer 130 by an injection molding process. The operations of the pattern zone are similar to those shown in FIGS. 1A-1C. The pattern zone 111 of the light-transmissible and reflective layer 110 is identical to the pattern zone 131 of the light-transmissible layer 130. Moreover, the pattern zone 111 of the light-transmissible and reflective layer 110 and the pattern zone 131 of the light-transmissible layer 130 are formed by a concave milling process. Similarly, there is a height difference d110 between the pattern zone 111 and the non-pattern zone 114 of the light-transmissible and reflective layer 110. Due to the height differences d and d110, the mirror image effects of the pattern zones 111 and 131 to provide the stereoscopic sense and the visual depth will be enhanced.

Figure 2:
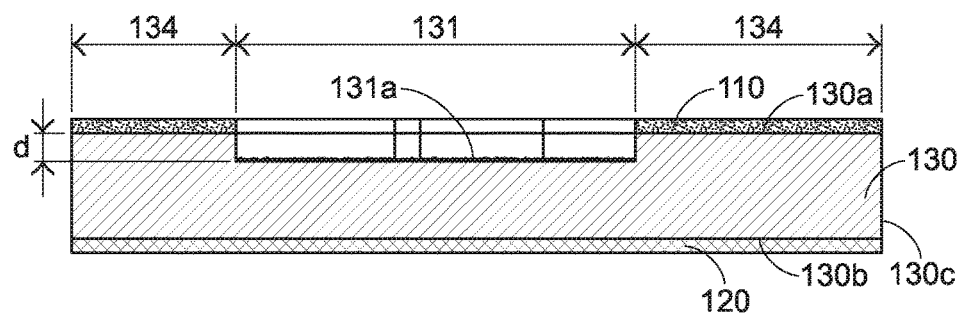
FIG. 2 is a schematic cross-sectional view illustrating an infinity mirror with microstructures according to an embodiment of the present invention.

FIG. 2 is a schematic cross-sectional view illustrating an infinity mirror with microstructures according to an embodiment of the present invention. In comparison with the infinity mirror of FIG. 1C, the infinity mirror of this embodiment further comprises plural microstructures 131a. The microstructures 131a are included in the pattern zone 231. As shown in FIG. 2, the pattern zone 231 comprises the microstructures 131a. For example, the microstructures 131a are rough edge structures or unsmooth surface structures such as embossed structures, texturing structures or any other appropriate microstructures with technological designs. Since the microstructures 131a can absorb portions of the light beams, the mirror image effect of the pattern zone 231 is enhanced.

As mentioned above, there is the height difference between the top surface of the pattern zone 111 and the top surface of the non-pattern zone 114, and there is the height difference between the top surface of the pattern zone 131 and the top surface of the non-pattern zone 134. The height difference between the top surface of the pattern zone 111 and the top surface of the non-pattern zone 114 and the height difference between the top surface of the pattern zone 131 and the top surface of the non-pattern zone 134 are not restricted. Take the light-transmissible layer 130 as an example. In an example, the top surface of the pattern zone 131 is higher than the top surface of the non-pattern zone 134. Alternatively, the top surface of the pattern zone 131 is lower than the top surface of the non-pattern zone 134. Alternatively, the top surface of a first portion of the pattern zone 131 is higher than the top surface of a first portion of the non-pattern zone 134, and the top surface of a second portion of the pattern zone 131 is lower than the top surface of a second portion of the non-pattern zone 134.

That is, the height difference between the top surface of the pattern zone 131 and the top surface of the non-pattern zone 134 is adjusted according to the design of the pattern zone 131. Due to the height difference, the reflected light beams are collected to the structure corresponding to the height difference. Since portions of the light beams are absorbed by the surface of the microstructure 131a, the mirror image effect of the pattern zone 231 corresponding to the height difference is enhanced. Consequently, the stereoscopic sense and the visual layering sense of the pattern zone 231 are enhanced.

Figure 3:
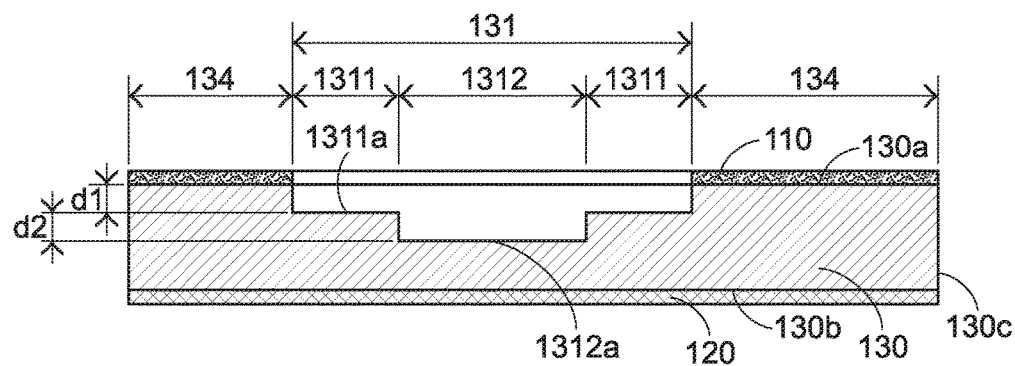
FIG. 3 is a schematic cross-sectional view illustrating an infinity mirror with microstructures according to another embodiment of the present invention.

FIG. 3 is a schematic cross-sectional view illustrating an infinity mirror with microstructures according to another embodiment of the present invention. In this embodiment, the pattern zone 331 of the light-transmissible layer 330 is divided into a first pattern sub-zone 1311 and a second pattern sub-zone 1312. The first pattern sub-zone 1311 and the second pattern sub-zone 1312 are located at different levels. Moreover, plural first microstructures 1311a are included in the first pattern sub-zone 1311, and plural second microstructures 1312a are included in the second pattern sub-zone 1312.

As shown in FIG. 3, the first pattern sub-zone 1311 and the second pattern sub-zone 1312 are located at different levels. Moreover, the first pattern sub-zone 1311 has a height d1, and the second pattern sub-zone 1312 has a height d2. The height d1 of the first pattern sub-zone 1311 is a depth of the concave structure of the light-transmissible layer 330 that is concaved toward the reflective layer 120. The height d2 of the second pattern sub-zone 1312 is a depth of the concave structure of the light-transmissible layer 330 that is concaved from the first pattern sub-zone 1311 and in the direction toward the reflective layer 120. Because of the first pattern sub-zone 1311 and the second pattern sub-zone 1312, the desired mirror image effect of the infinity mirror can be achieved. That is, the height d1 of the first pattern sub-zone 1311 and the height d2 of the second pattern sub-zone 1312 can be adjusted according to the practical requirements. Consequently, different mirror image effects can be produced.

Moreover, the plural first microstructures 1311a are included in the first pattern sub-zone 1311, and the plural second microstructures 1312a are included in the second pattern sub-zone 1312. In an embodiment, the first microstructures 1311a and the second microstructures 1312a have different technological designs. For example, the first microstructures 1311a are embossed structures, and the second microstructures 1312a are rough edge structures. Because of the first microstructures 1311a and the second microstructures 1312a, the multi-mirror image effect is diversified.

Figure 4:
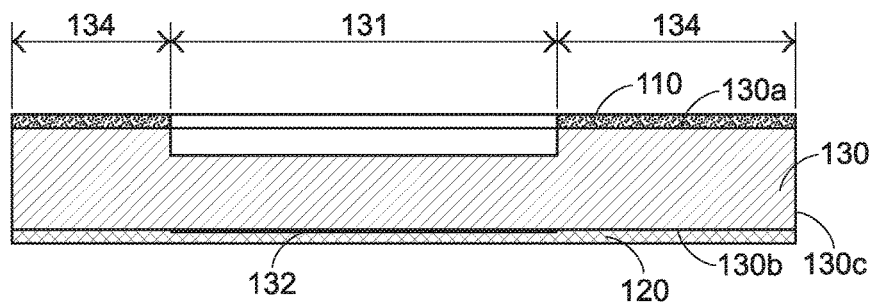
FIG. 4 is a schematic cross-sectional view illustrating an infinity mirror with a printed layer according to an embodiment of the present invention.

FIG. 4 is a schematic cross-sectional view illustrating an infinity mirror with a printed layer according to an embodiment of the present invention. In comparison with the infinity mirror of FIGS. 1A-1C, the infinity mirror of FIG. 4 further comprises a printed layer 132. The printed layer 132 is formed by printing a picture on the bottom surface 130b of the light-transmissible layer 130. Consequently, the infinity mirror can produce the reflected image effect of the printed layer 132. It is noted that the examples of the pattern zone 131 and the printed layer 132 are not restricted. That is, the examples of the pattern zone 131 and the printed layer 132 may be varied according to the product design. In case that the pattern of the pattern zone 131 and the picture of the printed layer 132 are identical, the multi-mirror image effect corresponding to the pattern zone 131 of the infinity mirror is enhanced. In some cases, the pattern of the pattern zone 131 and the picture of the printed layer 132 are different. For example, the pattern of the pattern zone 131 is a product logo, and the picture of the printed layer 132 is a screentone background or a picture matching the product logo. Consequently, when the infinity mirror is watched by the user, the user can visually feel the multi-mirror image effect and the beauty of stereoscopic depth.

Figure 5:
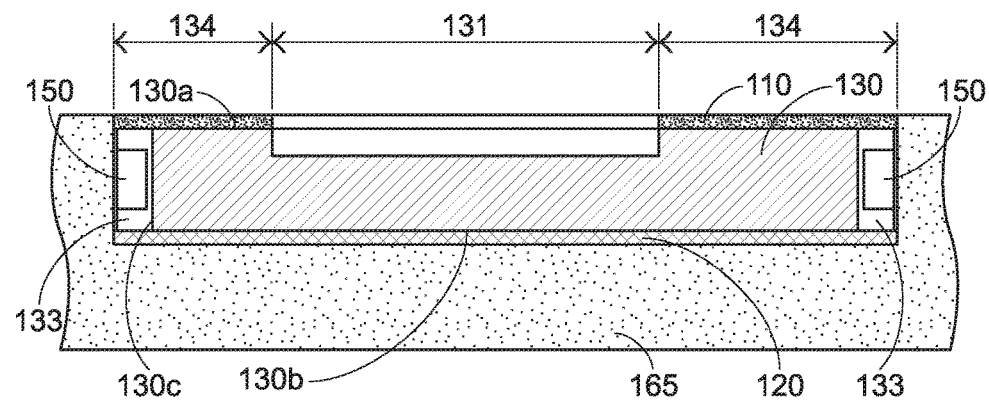
FIG. 5 is a schematic cross-sectional view illustrating an infinity mirror with light-emitting elements according to an embodiment of the present invention.

FIG. 5 is a schematic cross-sectional view illustrating an infinity mirror with light-emitting elements according to an embodiment of the present invention. In comparison with the infinity mirror of FIGS. 1A-1C, the infinity mirror of FIG. 5 further comprises plural light-emitting elements 150 and plural receiving recesses 133. The receiving recesses 133 are formed in the outer periphery 130c of the light-transmissible layer 130. The plural light-emitting elements 150 are accommodated within the receiving recesses 133. Consequently, the light beams emitted by the light-emitting elements 150 are projected from the outer periphery 130c to the region between the light-transmissible and reflective layer 110 and the reflective layer 120. For example, an example of the light-emitting element 150 includes a light emitting diode (LED), an organic light-emitting diode (OLED) and/or a luminescent paper. It is noted that the examples of the light-emitting elements 150 are not restricted. In some other embodiments, the plural light-emitting elements 150 are disposed on the sidewalls of an outer shell 165 of a heat sink of an electronic device (e.g., the sidewalls of the outer shell of a display card). Moreover, the plural light-emitting elements 150 are electrically connected with an external power source through plural power wires. Consequently, the plural light-emitting elements 150 are powered by the external power source. It is noted that the media of transmitting electric power to the light-emitting elements 150 are not restricted to the power wires.

Figure 6:
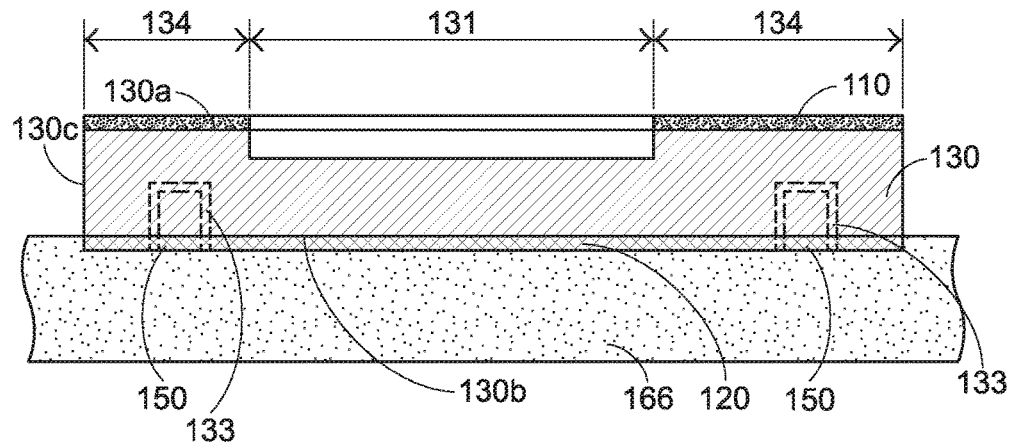
FIG. 6 is a schematic cross-sectional view illustrating an infinity mirror with light-emitting elements according to another embodiment of the present invention.

Moreover, the applications of the light-emitting elements 150 and the receiving recesses 133 may be modified or altered. FIG. 6 is a schematic cross-sectional view illustrating an infinity mirror with light-emitting elements according to another embodiment of the present invention. The infinity mirror of this embodiment further comprises plural light-emitting elements 650 and plural receiving recesses 633. In comparison with the embodiment of FIG. 5, the receiving recesses 633 are formed in the bottom side of the infinity mirror. The light-emitting elements 650 are accommodated within the corresponding receiving recesses 633. According to the positions of the receiving recesses 633, the light beams emitted by the light-emitting elements 650 are transmitted and reflected through the light-transmissible layer 130. It is noted that the applications and combinations of the light-emitting elements and the receiving recesses may be altered according to the practical requirements. That is, the positions of the light-emitting elements and the receiving recesses are not restricted. Moreover, the infinity mirror can be applied to a bottom of an outer shell of a heat sink of an electronic device, and the plural light-emitting elements 650 are disposed on the outer surface 166 of the heat sink. The functions of the components of are presented herein for purpose of illustration and description only. It is noted that numerous modifications and alterations may be made while retaining the teachings of the invention.

Figure 7:
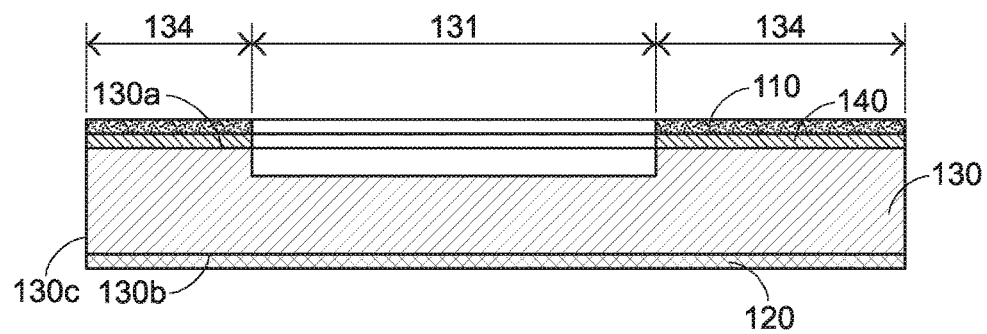
FIG. 7 is a schematic cross-sectional view illustrating an infinity mirror with a temperature-sensitive film according to an embodiment of the present invention.

FIG. 7 is a schematic cross-sectional view illustrating an infinity mirror with a temperature-sensitive film according to an embodiment of the present invention. In comparison with the infinity mirror of FIGS. 1A-1C, the infinity mirror of this embodiment further comprises a temperature-sensitive film 140. The temperature-sensitive film 140 is arranged between the reflective layer 110 and the light-transmissible layer 130. The temperature-sensitive film 140 is used for sensing the change of an ambient temperature of the infinity mirror. When the change of the ambient temperature is sensed, the displayed color of the temperature-sensitive film 140 is correspondingly changed. In an embodiment, the temperature-sensitive film 140 is formed by coating temperature-sensitive paint. In response to the change of the ambient temperature of the infinity mirror, the color of the mirror image effect of the infinity mirror is correspondingly changed.

Please refer to FIG. 7 again. The application of the temperature-sensitive film 140 on the infinity mirror will be described as follows. For example, the infinity mirror is applied to a heat sink of a display card or an integrated circuit board. The infinity mirror is installed on a bottom of an outer shell of the heat sink. The installation position of the infinity mirror on the heat sink is not restricted. For example, the infinity mirror may be installed on an outer side of the heat sink. The efficacy and function of the infinity mirror to reflect the mirror image are not influenced by the position of the infinity mirror. In response to the change of the ambient temperature of the display card, the change of the color temperature of the multi-mirror image effect is changed by the temperature-sensitive film of the infinity mirror. Consequently, the user can realize the performance and temperature status of the display card or the electronic device with the infinity mirror of the present invention.

From the above descriptions, the present invention provides an infinity mirror with diversified technological designs and expansive applications. Due to the height difference between the pattern zone and the non-pattern zone of the infinity mirror, the multi-mirror image effect corresponding to the overall pattern zone is enhanced. Moreover, in case that the microstructures are disposed on the top surface of the pattern zone, the multi-mirror image effect corresponding to the overall pattern zone is further enhanced. In case that the printed layer is formed on a surface of the light-transmissible layer, the light beams reflected in the infinity mirror can produce the multi-mirror image effect with the layering sense. In case that the temperature-sensitive film is arranged between the reflective layer and the light-transmissible layer, the temperature-sensitive film can sense the change of the ambient temperature and display the temperature status of the environment. Since the multi-mirror image effect is enhanced, the visual beauty is increased and the function of sensing the ambient temperature is achieved, the applications of the infinity mirror are expanded.

While the invention has been described in terms of what is presently considered to be the most practical and preferred embodiments, it is to be understood that the invention needs not be limited to the disclosed embodiments. On the contrary, it is intended to cover diversified modifications and similar arrangements included within the spirit and scope of the appended claims which are to be accorded with the broadest interpretation so as to encompass all such modifications and similar structures.

What is claimed is:

1. An infinity mirror, comprising:
    a light-transmissible layer comprising a pattern zone and a non-pattern zone, wherein there is a height difference between the pattern zone and the non-pattern zone of the light-transmissible layer;
    a light-transmissible and reflective layer disposed on a top surface of the light-transmissible layer;
    a reflective layer disposed on a bottom surface of the light-transmissible layer; and
    at least one light-emitting element emitting a light beam;
    wherein, a receiving space is formed in the light-transmissible layer, and the at least one light-emitting element is accommodated within the receiving space, wherein the receiving space is formed in an outer periphery of the light-transmissible layer or formed in a bottom surface of the light-transmissible layer.

2. The infinity mirror according to claim 1, wherein the light-transmissible and reflective layer further comprises a second pattern zone and a second non-pattern zone corresponding to the pattern zone and the non-pattern zone of the light-transmissible layer, wherein sizes and shapes of the second pattern zone and the second non-pattern zone of the light-transmissible and reflective layer are respectively identical to sizes and shapes of the pattern zone and the non-pattern zone of the light-transmissible layer, and there is a second height difference between the second pattern zone and the second non-pattern zone of the light-transmissible and reflective layer.

3. The infinity mirror according to claim 1, wherein at least one microstructure is included in the pattern zone, and the at least one microstructure includes an unsmooth surface structure.

4. The infinity mirror according to claim 1, wherein the pattern zone includes a text, a number, a symbol, a geometric pattern and/or a totem.

5. The infinity mirror according to claim 1, wherein a transparency/reflectivity ratio of the light-transmissible and reflective layer is in a range between 40/60 and 90/10.

6. The infinity mirror according to claim 1, wherein the infinity mirror further comprises a temperature-sensitive film, and the temperature-sensitive film is arranged between the reflective layer and the light-transmissible layer, wherein when a change of the ambient temperature is sensed by the temperature-sensitive film, a color of the temperature-sensitive film is correspondingly changed.

7. The infinity mirror according to claim 1, wherein the infinity mirror further comprises a printed layer, and the printed layer is arranged between the light-transmissible layer and the reflective layer.

8. The infinity mirror according to claim 1, wherein the at least one light-emitting element is disposed on an outer shell of a heat sink of an electronic device, and the infinity mirror is installed on the outer shell of the heat sink.

9. The infinity mirror according to claim 1, wherein the at least one light-emitting element includes a light emitting diode, an organic light-emitting diode and/or a luminescent paper.

10. The infinity mirror according to claim 1, wherein a top surface of the pattern zone is higher than a top surface of the non-pattern zone.

11. The infinity mirror according to claim 1, wherein a top surface of the pattern zone is lower than a top surface of the non-pattern zone.

12. The infinity mirror according to claim 1, wherein a top surface of a first portion of the pattern zone is higher than a top surface of a first portion of the non-pattern zone, and a top surface of a second portion of the pattern zone is lower than a top surface of a second portion of the non-pattern zone.

* * * * *